United States Patent
Downie et al.

(10) Patent No.: US 9,159,012 B2
(45) Date of Patent: Oct. 13, 2015

(54) RFID CONDITION LATCHING

(75) Inventors: John David Downie, Painted Post, NY (US); James Scott Sutherland, Corning, NY (US); Bradley R Thurow, Fargo, ND (US); Richard Edward Wagner, Painted Post, NY (US); Dale Alan Webb, Corning, NY (US); Matthew Scott Whiting, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 934 days.

(21) Appl. No.: 12/956,271

(22) Filed: Nov. 30, 2010

(65) Prior Publication Data
US 2011/0140856 A1   Jun. 16, 2011

Related U.S. Application Data

(60) Provisional application No. 61/265,089, filed on Nov. 30, 2009.

(51) Int. Cl.
*H04Q 5/22* (2006.01)
*G06K 19/07* (2006.01)

(52) U.S. Cl.
CPC ........ *G06K 19/0723* (2013.01); *G06K 19/0707* (2013.01); *G06K 19/0712* (2013.01); *G06K 19/0717* (2013.01)

(58) Field of Classification Search
CPC ....... G08B 5/22; H04Q 5/22; G06K 19/07749
USPC .......... 340/10.1, 10.51, 545.6, 572.1, 870.17, 340/686.1, 572.8, 10.41, 10.3, 3.41, 825; 343/822; 235/492
See application file for complete search history.

(56) References Cited

U.S. PATENT DOCUMENTS

| 4,072,930 A | 2/1978 | Lucero et al. |
| 4,812,007 A | 3/1989 | Lukas |

(Continued)

FOREIGN PATENT DOCUMENTS

| CN | 1395975 A | 2/2003 |
| CN | 1496019 A | 5/2004 |

(Continued)

OTHER PUBLICATIONS

Written Open of the International Searching Authority for European Patent application 10788172.4-2210 mailed Jul. 6, 2012, 14 pages.

(Continued)

*Primary Examiner* — Steven Lim
*Assistant Examiner* — Kaleria Knox (57) ABSTRACT

A passive radio-frequency identification (RFID) system has an RFID reader that communicates with and provides power to an RFID tag. The RFID tag has an RFID integrated circuit chip that contains a memory device for storing information to be transmitted to the RFID reader, and energy storage device that stores energy for powering the integrated circuit chip. In the event that the RFID tag is activated during periods when the RFID integrated circuit chip is not receiving sufficient energy from the RFID reader, then either an energy storage device is provided to allow the activation event to be recorded at the RFID integrated circuit chip, or a memory device is provided that senses and records the activation event and communicates this activation event once power has been restored.

23 Claims, 7 Drawing Sheets

(56) References Cited

U.S. PATENT DOCUMENTS

| | | |
|---|---|---|
| 4,889,977 A | 12/1989 | Haydon |
| 4,925,205 A | 5/1990 | Villalon et al. |
| 5,018,759 A | 5/1991 | Villalon et al. |
| 5,263,032 A | 11/1993 | Porter et al. |
| 5,483,467 A | 1/1996 | Krupka et al. |
| 5,499,012 A | 3/1996 | Tracy et al. |
| 5,528,222 A | 6/1996 | Moskowitz et al. |
| 5,638,474 A | 6/1997 | Lampert et al. |
| 5,737,464 A | 4/1998 | Underwood et al. |
| 5,772,461 A | 6/1998 | Yu |
| 5,821,510 A | 10/1998 | Cohen et al. |
| 5,848,910 A | 12/1998 | Crocker |
| 5,892,870 A | 4/1999 | Fingler et al. |
| 5,910,776 A | 6/1999 | Black |
| 5,914,862 A | 6/1999 | Ferguson et al. |
| 5,995,006 A | 11/1999 | Walsh |
| 6,002,331 A | 12/1999 | Laor |
| 6,025,725 A | 2/2000 | Gershenfeld et al. |
| 6,025,783 A | 2/2000 | Steffens, Jr. |
| 6,100,804 A | 8/2000 | Brady et al. |
| 6,118,379 A | 9/2000 | Kodukula et al. |
| 6,127,929 A | 10/2000 | Roz |
| 6,133,835 A | 10/2000 | De Leeuw et al. |
| 6,164,551 A | 12/2000 | Altwasser |
| 6,232,870 B1 | 5/2001 | Garber et al. |
| 6,320,509 B1 | 11/2001 | Brady et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,496,113 B2 | 12/2002 | Lee et al. |
| 6,496,382 B1 | 12/2002 | Ferguson et al. |
| 6,517,000 B1 | 2/2003 | McAllister et al. |
| 6,522,308 B1 | 2/2003 | Mathieu |
| 6,552,664 B2 | 4/2003 | Nishikawa et al. |
| 6,592,266 B1 | 7/2003 | Hankins et al. |
| 6,609,833 B1 | 8/2003 | Miyachi et al. |
| 6,618,022 B2 | 9/2003 | Harvey |
| 6,693,513 B2 | 2/2004 | Tuttle |
| 6,752,538 B1 | 6/2004 | Bates, III |
| 6,784,802 B1 | 8/2004 | Stanescu |
| 6,806,808 B1 | 10/2004 | Watters et al. |
| 6,808,116 B1 | 10/2004 | Eslambolchi et al. |
| 6,821,024 B2 | 11/2004 | Bates, III |
| 6,829,427 B1 | 12/2004 | Becker |
| 6,847,586 B1 | 1/2005 | Chen |
| 6,857,897 B2 | 2/2005 | Conn |
| 6,897,374 B2 | 5/2005 | Garber et al. |
| 6,898,368 B2 | 5/2005 | Colombo et al. |
| 6,899,626 B1 | 5/2005 | Luciano et al. |
| 6,915,050 B2 | 7/2005 | Koyasu et al. |
| 6,924,997 B2 | 8/2005 | Chen et al. |
| 6,968,994 B1 | 11/2005 | Smith |
| 6,971,895 B2 | 12/2005 | Sago et al. |
| 6,973,243 B2 | 12/2005 | Koyasu et al. |
| 6,992,599 B2 | 1/2006 | Vergnaud et al. |
| 6,999,028 B2 | 2/2006 | Egbert |
| 7,014,100 B2 | 3/2006 | Zierolf |
| 7,034,683 B2 | 4/2006 | Ghazarian |
| 7,061,366 B2 | 6/2006 | Bell et al. |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,168,972 B1 | 1/2007 | Autry et al. |
| 7,170,393 B2 | 1/2007 | Martin |
| 7,193,422 B2 | 3/2007 | Velleca et al. |
| 7,194,180 B2 | 3/2007 | Becker |
| 7,205,898 B2 | 4/2007 | Dixon et al. |
| 7,209,042 B2 | 4/2007 | Martin et al. |
| 7,210,858 B2 | 5/2007 | Sago et al |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,243,837 B2 | 7/2007 | Durrant et al. |
| 7,249,705 B2 | 7/2007 | Dudley |
| 7,253,735 B2 | 8/2007 | Gengel et al. |
| 7,265,674 B2 | 9/2007 | Tuttle |
| 7,275,970 B2 | 10/2007 | Hoshina |
| 7,294,786 B2 | 11/2007 | Aldereguia et al. |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,307,408 B2 | 12/2007 | Porcu et al. |
| 7,336,883 B2 | 2/2008 | Scholtz |
| 7,348,884 B2 | 3/2008 | Higham |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 7,374,101 B2 | 5/2008 | Kaneko |
| 7,468,669 B1 | 12/2008 | Beck et al. |
| 7,495,558 B2 | 2/2009 | Pope et al. |
| 7,515,048 B1 | 4/2009 | Bhattiprolu et al. |
| 7,551,854 B2 | 6/2009 | Horiuchi et al. |
| 7,554,448 B2 | 6/2009 | Tomioka |
| 7,605,707 B2 | 10/2009 | German et al. |
| 7,642,916 B2 | 1/2010 | Phipps et al. |
| 7,657,338 B2 | 2/2010 | Opaterny |
| 7,695,310 B1 | 4/2010 | Boyer et al. |
| 7,731,094 B2 * | 6/2010 | Phillips ......... 235/492 |
| 7,757,936 B2 | 7/2010 | Aguren et al. |
| 7,772,975 B2 | 8/2010 | Downie et al. |
| 7,782,202 B2 | 8/2010 | Downie et al. |
| 7,786,861 B2 | 8/2010 | Howarth et al. |
| 7,812,737 B1 | 10/2010 | Hunter |
| 7,854,623 B2 | 12/2010 | Radenne et al. |
| 7,898,397 B2 | 3/2011 | Kerr et al. |
| 7,909,619 B2 | 3/2011 | Pepe et al. |
| 7,961,097 B2 | 6/2011 | Porte et al. |
| 7,965,186 B2 | 6/2011 | Downie et al. |
| 7,973,662 B2 | 7/2011 | Phipps et al. |
| 8,044,804 B1 | 10/2011 | McReynolds |
| 8,106,752 B2 | 1/2012 | Golden |
| RE43,178 E | 2/2012 | Ghazarian |
| 8,162,738 B2 | 4/2012 | Erickson |
| 8,172,468 B2 | 5/2012 | Jones et al. |
| 8,233,804 B2 | 7/2012 | Aguren |
| 8,260,132 B2 | 9/2012 | Aguren |
| 8,324,519 B2 | 12/2012 | Slicker et al. |
| 8,333,518 B2 | 12/2012 | Jones et al. |
| 8,334,752 B2 | 12/2012 | Kukita et al. |
| 8,334,761 B2 | 12/2012 | Golden |
| 2001/0004236 A1* | 6/2001 | Letkomiller et al. ...... 340/572.1 |
| 2002/0089434 A1 | 7/2002 | Ghazarian |
| 2002/0092347 A1 | 7/2002 | Niekerk et al. |
| 2002/0140546 A1* | 10/2002 | Tuttle ........... 340/10.1 |
| 2003/0016130 A1* | 1/2003 | Joao ............ 340/539 |
| 2003/0016136 A1* | 1/2003 | Harvey ......... 340/686.1 |
| 2003/0021580 A1 | 1/2003 | Matthews |
| 2003/0061393 A1 | 3/2003 | Steegmans et al. |
| 2003/0179073 A1 | 9/2003 | Ghazarian |
| 2004/0041714 A1* | 3/2004 | Forster ......... 340/870.17 |
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0145454 A1 | 7/2004 | Powell et al. |
| 2004/0149736 A1 | 8/2004 | Clothier |
| 2004/0202431 A1 | 10/2004 | Bates, III |
| 2004/0253874 A1 | 12/2004 | Plishner |
| 2004/0257199 A1 | 12/2004 | Fitzgibbon et al. |
| 2005/0024287 A1* | 2/2005 | Jo et al. ........ 343/822 |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0150962 A1 | 7/2005 | Colombo et al. |

(56) References Cited

U.S. PATENT DOCUMENTS

| | | |
|---|---|---|
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0242950 A1 | 11/2005 | Lindsay et al. |
| 2005/0259930 A1 | 11/2005 | Elkins et al. |
| 2005/0280512 A1 | 12/2005 | Forster |
| 2005/0285718 A1 | 12/2005 | Enguent |
| 2005/0286893 A1 | 12/2005 | Horiuchi et al. |
| 2006/0006242 A1 | 1/2006 | Hashimoto et al. |
| 2006/0006999 A1 | 1/2006 | Walczyk et al. |
| 2006/0015233 A1 | 1/2006 | Olsen, III et al. |
| 2006/0019540 A1 | 1/2006 | Werthman et al. |
| 2006/0044148 A1 | 3/2006 | Daniels et al. |
| 2006/0049942 A1 | 3/2006 | Sakama et al. |
| 2006/0139149 A1 | 6/2006 | Faro et al. |
| 2006/0145863 A1 | 7/2006 | Martin et al. |
| 2006/0148279 A1 | 7/2006 | German et al. |
| 2006/0166546 A1 | 7/2006 | Ashizawa et al. |
| 2006/0187031 A1 | 8/2006 | Moretti et al. |
| 2006/0214775 A1* | 9/2006 | Watanabe et al. .......... 340/10.41 |
| 2006/0232419 A1 | 10/2006 | Tomioka et al. |
| 2006/0233506 A1 | 10/2006 | Noonan et al. |
| 2006/0267737 A1* | 11/2006 | Colby ....................... 340/10.51 |
| 2006/0267778 A1 | 11/2006 | Gengel et al. |
| 2007/0018787 A1 | 1/2007 | Martinez de Velasco Cortina et al. |
| 2007/0023525 A1 | 2/2007 | Son et al. |
| 2007/0053644 A1 | 3/2007 | Scholtz |
| 2007/0057771 A1 | 3/2007 | Tomioka |
| 2007/0120684 A1 | 5/2007 | Utaka et al. |
| 2007/0152828 A1 | 7/2007 | Mohalik |
| 2007/0176745 A1 | 8/2007 | Gibson et al. |
| 2007/0205897 A1 | 9/2007 | Forster |
| 2007/0205902 A1 | 9/2007 | Cote et al. |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0270744 A1 | 11/2007 | Dacquay et al. |
| 2007/0273507 A1 | 11/2007 | Burchell et al. |
| 2008/0030353 A1 | 2/2008 | O'Toole et al. |
| 2008/0048826 A1 | 2/2008 | Agrawal et al. |
| 2008/0048857 A1 | 2/2008 | Billmaier et al. |
| 2008/0082298 A1 | 4/2008 | Sjolander |
| 2008/0100456 A1* | 5/2008 | Downie et al. ............. 340/572.8 |
| 2008/0100467 A1 | 5/2008 | Downie et al. |
| 2008/0122579 A1 | 5/2008 | German et al. |
| 2008/0136634 A1 | 6/2008 | Porte et al. |
| 2008/0159738 A1 | 7/2008 | Lavranchuk |
| 2008/0220721 A1 | 9/2008 | Downie et al. |
| 2008/0240724 A1 | 10/2008 | Aguren |
| 2008/0279555 A1 | 11/2008 | Horiuchi et al. |
| 2008/0298019 A1 | 12/2008 | Spearing et al. |
| 2009/0032577 A1 | 2/2009 | Aguren et al. |
| 2009/0108989 A1 | 4/2009 | Sinclair |
| 2009/0184165 A1 | 7/2009 | Bertness et al. |
| 2009/0206995 A1 | 8/2009 | Forster |
| 2009/0213830 A1 | 8/2009 | Duesberg et al. |
| 2010/0079248 A1 | 4/2010 | Greveling |
| 2010/0080554 A1 | 4/2010 | Aguren |
| 2010/0123580 A1* | 5/2010 | Marmigere et al. ....... 340/545.6 |
| 2010/0148933 A1 | 6/2010 | Dacus |
| 2010/0210011 A1 | 8/2010 | Hilpert et al. |
| 2010/0245057 A1 | 9/2010 | Chamarti et al. |
| 2011/0043333 A1 | 2/2011 | German |
| 2011/0130720 A1 | 6/2011 | Strobl et al. |
| 2011/0205058 A1 | 8/2011 | Phipps et al. |
| 2011/0274437 A1 | 11/2011 | Jones et al. |
| 2012/0007717 A1 | 1/2012 | Jong |
| 2012/0019363 A1 | 1/2012 | Fein |
| 2012/0067709 A1 | 3/2012 | Slicker et al. |
| 2012/0086569 A1 | 4/2012 | Golden |
| 2012/0126949 A1 | 5/2012 | Downie et al. |
| 2012/0126950 A1 | 5/2012 | Downie et al. |
| 2012/0133490 A1 | 5/2012 | Downie et al. |
| 2012/0168521 A1 | 7/2012 | Jones et al. |
| 2012/0256756 A1 | 10/2012 | Johnson et al. |
| 2012/0257890 A1 | 10/2012 | Aguren |
| 2012/0274452 A1 | 11/2012 | Chamarti et al. |
| 2013/0300539 A1 | 11/2013 | Glidden, III |

FOREIGN PATENT DOCUMENTS

| | | |
|---|---|---|
| CN | 1293508 C | 1/2007 |
| CN | 101636767 A | 1/2010 |
| CN | 101636890 A | 1/2010 |
| DE | 19841738 | 3/2000 |
| DE | 10249414 A1 | 5/2004 |
| EP | 1455550 A2 | 9/2004 |
| EP | 1959579 A1 | 8/2008 |
| GB | 2371211 A | 7/2002 |
| JP | 03242795 | 10/1991 |
| JP | 2003148653 | 10/1991 |
| JP | 2002264617 | 9/2002 |
| JP | 2003172827 | 6/2003 |
| JP | 2003229215 | 8/2003 |
| JP | 2004039389 | 2/2004 |
| JP | 2004142500 | 5/2004 |
| JP | 2004152543 | 5/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005033857 | 2/2005 |
| JP | 2005050581 | 2/2005 |
| JP | 2005084162 | 3/2005 |
| JP | 2005086901 | 3/2005 |
| JP | 2005087135 | 4/2005 |
| JP | 2005092107 | 4/2005 |
| JP | 2005134125 | 5/2005 |
| JP | 2005216698 | 8/2005 |
| JP | 2005302403 | 10/2005 |
| JP | 2005315980 | 11/2005 |
| JP | 2005339983 | 12/2005 |
| JP | 2006054118 | 2/2006 |
| JP | 2006245983 | 9/2006 |
| JP | 2006279650 | 10/2006 |
| JP | 2007087849 | 4/2007 |
| JP | 2007088957 | 4/2007 |
| JP | 2007158993 | 6/2007 |
| JP | 2007189774 | 7/2007 |
| JP | 2007221400 | 8/2007 |
| JP | 2008135882 A | 6/2008 |
| WO | 03098175 A1 | 11/2003 |
| WO | 2004030154 A2 | 4/2004 |
| WO | 2005069203 A2 | 7/2005 |
| WO | 2006058119 A1 | 6/2006 |
| WO | 2008000656 A1 | 1/2008 |
| WO | 2008038896 A1 | 4/2008 |
| WO | 2009/091888 | 7/2009 |
| WO | 2009091888 A1 | 7/2009 |

OTHER PUBLICATIONS

International Search Report for PCT/US2010/057605 mailed Feb. 17, 2011, 2 pages.

Non-final Office Action for U.S. Appl. No. 13/418,752 mailed Jul. 2, 2012, 8 pages.

Non-final Office Action for U.S. Appl. No. 13/094,026 mailed Mar. 26, 2013, 24 pages.

Written Opinion of the International Searching Authority for European patent application 11720243.2 mailed Dec. 18, 2012, 8 pages.

Decision on Rejection for Chinese patent application 200780046357.1 mailed Nov. 5, 2012, 7 pages.

Author Unknown, "How can an RFID reader interrogate multiple tags simultaneously?", RFID Journal, Sep. 8, 2010, 2 pages, www.rfidjournal.com/expert/entry/7853.

Third Office Action for Chinese patent application 200880104077.6 mailed Feb. 17, 2013, 17 pages.

International Preliminary Report on Patentability for PCT/US2012/030779 mailed Nov. 7, 2013, 6 pages.

(56) References Cited

OTHER PUBLICATIONS

Advisory Action for U.S. Appl. No. 13/094,026 mailed Feb. 11, 2014, 5 pages.
Communication under Rule 71 (3) EPC for European patent application 11720243.2 mailed Feb. 12, 2014, 7 pages.
International Search Report for PCT/US2013/039894 mailed Sep. 3, 2013, 3 pages.
Final Office Action for U.S. Appl. No. 13/094,026 mailed Nov. 20, 2013, 33 pages.
Non-final Office Action for U.S. Appl. No. 13/826,261 mailed Oct. 23, 2013, 17 pages.
First Office Action for Chinese patent application 201180022558.4 mailed Apr. 30, 2014, 10 pages.
International Search Report and Written Opinion for PCT/US2013/053335 mailed May 21, 2014, 11 pages.
Final Office Action for U.S. Appl. No. 13/826,261 mailed May 16, 2014, 17 pages.
Notice on Reexamination for Chinese Patent Application 200780046357.1 mailed Jul. 24, 2014, 7 pages.
First Office Action for Chinese patent application 201080062636.9 mailed Jul. 31, 2014, 23 pages.
Translation of Search Report for Taiwan patent application 099108786 mailed Dec. 27, 2014, 1 page.
Non-final Office Action for U.S. Appl. No. 13/470,571 mailed Mar. 18, 2015, 6 pages.
Non-final Office Action for U.S. Appl. No. 13/566,228 mailed Jan. 28, 2015, 28 pages.
Notice on Reexamination for Chinese patent application 200780046357.1 mailed Mar. 10, 2015, 12 pages.
Second Office Action for Chinese patent application 201080062636.9 mailed Jan. 16, 2015, 7 pages.
International Preliminary Report on Patentability for PCT/US2013/053335 mailed Feb. 12, 2015, 7 pages.
Advisory Action and Applicant-Initiated Interview Summary for U.S. Appl. No. 13/826,261 mailed Jul. 31, 2014, 5 pages.
Advisory Action for U.S. Appl. No. 13/826,261 mailed Aug. 29, 2014, 3 pages.
Non-final Office Action for U.S. Appl. No. 13/826,261 mailed Jan. 7, 2015, 14 pages.
First Office Action for Chinese patent application 201080015805.3 mailed Jul. 23, 2013, 17 pages.
Non-final Office Action for U.S. Appl. No. 13/094,026 mailed Aug. 2, 2013, 25 pages.
Extended European Search Report for European Patent Application 07870826.0 mailed Jun. 15, 2015, 8 pages.
Translation of the Third Office Action for Chinese Patent Application 201080062636.9 mailed Jul. 22, 2015, 9 pages.
Notice of Allowance for U.S. Appl. No. 13/470,571 mailed Jul. 21, 2015, 7 pages.
Final Office Action for U.S. Appl. No. 13/566,228 mailed Jul. 8, 2015, 30 pages.
Final Office Action for U.S. Appl. No. 13/826,261 mailed Jun. 24, 2015, 16 pages.

\* cited by examiner

RFID CONDITION LATCHING

CROSS REFERENCE TO RELATED APPLICATION

This application claims the benefit of priority to U.S. Provisional Application No. 61/265,089, filed on Nov. 30, 2009.

BACKGROUND OF THE INVENTION

1. Field of the Invention

The present invention relates generally to radio-frequency identification (RFID) technology, and in particular relates to RFID-based systems and methods for detecting that a condition has occurred in an RFID tag even when the RFID tag is not powered, by storing and managing power in RFID tags.

2. Technical Background

Radio-frequency identification (RFID) is a remote recognition technique that utilizes RFID tags having information stored therein, usually in an integrated circuit (IC). The stored information is retrievable via RF communication between the RFID tag and an RFID tag reader. Certain RFID systems utilize hand-held RFID readers that when brought sufficiently close to an RFID tag are able to read an RFID tag signal either emitted by or backscattered from the tag. RFID systems are used for a variety of applications, including inventory management and product tracking in a number of different industries, as well as in libraries and hospitals.

RFID tags generally come in three varieties: passive, semi-passive, and active. Passive RFID tags have no energy or power source of their own and operate by harvesting energy from the RF signal (field) generated by the RFID-tag reader. Passive tags communicate back to the reader by modulating and back-scattering the RF signal from the RF reader. Semi-passive RFID tags communicate to the reader in the same way via modulation of the back-scattered reader RF signal, but they do not rely on harvesting energy from the reader field to power the RFID tag IC. Instead, semi-passive tags generally have their own power source, usually in the form of one or more batteries. Since the amount of power harvested by a passive tag usually limits its maximum distance from the reader antenna, semi-passive RFID tags usually have significantly greater read ranges than passive tags. Active tags also have a power source such as a battery that not only powers the RFID tag IC but that can also actively generate and transmits radiation to the RFID reader.

RFID tags can be designed to operate at different RF frequencies. At low frequencies (e.g., 100-130 KHz s) RFID tags often communicate via mutual inductance coupling between an RFID-reader coil antenna and an RFID-tag coil antenna. At these frequencies, the RFID reader's RF signal is not strongly absorbed by water. Since the user's hand is primarily composed of water, this means that at low RF frequencies the RF signal can penetrate the user's hand and enable two-way communication between the RFID tag and the RFID reader.

This low frequency inductance coupling approach is practical as long as the distance between the tag and the reader is a fraction of the wavelength of the RF signal. In typical low frequency RFID tag applications, the required separation between the RFID tag and the RFID reader (i.e., the "read distance") must be less than 1 m. This small separation is not suitable for many applications involving the RFID identification of hand-held items. In particular, the separation distance between RFID tags and RFID readers in typical item-identification applications within telecommunications data centers is expected to be 1 m to 3 m. Therefore, the low frequency RFID tag solution is not a practical approach for this and other such applications.

RFID tags designed to operate at higher frequencies (e.g., ultra-high frequencies of 900 MHz or greater) typically operate by the RFID tag capturing far-field radiation from the RFID reader antenna transmission using a local monopole, dipole or modified dipole antenna (e.g., a "squiggle antenna").

The electric signal formed by the RFID tag antenna is processed by a rectifier circuit in the RFID tag's IC chip, yielding energy that powers the rest of the IC chip and enables the IC chip to transmit a return signal to the RFID reader. As mentioned above, communication with the RFID reader is often via backscatter modulation of the RFID reader signal rather than by independent RF signal transmission from the RFID tag.

Ultra-high-frequency RFID tags can communicate with RFID readers at much greater read distances (e.g., 5 to 10 m) than low frequency RFID tags (1 m or less). Ultra-high-frequency RFID tags are thus better suited for applications involving the RFID identification of hand-held items.

A problem with using ultra-high frequency RFID tags for the identification of hand-held items arises due to the strong absorption of high-frequency RF signal power by water. When a user places their hand around an item with an RFID tag just prior to engaging, water in the user's hand attenuates the reader's RF signal when the hand blocks the RF communication path. Even in cases where the user's hand only partially blocks the RF communication path, it can still significantly reduce the RF signal strength. In this situation, the RFID tag may not receive sufficient energy to power its internal circuitry. Likewise, the RFID tag's response to the RFID reader may be impeded by the presence of the user's hand.

In the case where the RFID tag does not receive adequate power to operate, no signal is communicated to the RFID tag reader. When the user removes their hand from the item and disengages the switch, then the RFID tag once again receives RF power from the RFID reader and powers up. An approach is described that enables the RFID tag reader to detect when an event has occurs at the RFID tag during periods when the power to the RFID tag has been interrupted.

SUMMARY OF THE INVENTION

One aspect of the invention is an RFID tag for use with an RFID reader that transmits RF signals to the RFID tag via a RF communication path. The RFID tag includes an RFID integrated circuit (IC) chip electrically coupled to an RF antenna system and adapted to be externally powered by the RF signals. The RFID tag also includes an energy storage device operably coupled to the RFID IC chip and adapted to store energy from the RF signals. The RFID tag also includes a memory device that is powered by the energy device so as to store switch-state information when the RFID IC chip is inadequately externally powered so that when the RFID IC chip is adequately externally powered it causes the tag antenna system to transmit an RF activation signal representative of the stored activation information.

Certain passive RFID tags have a switch (e.g., a push-button) that activates the RFID tag and/or that serves to program the RFID tag in some manner. In the latter instance, such programming may include setting the RFID tag to a particular operating state and/or inputting information into the tag. For example, the switch may be used to store information indicating that a person has handled the RFID tag. The switch may also be used to set a flag or a bit in the RFID tag's memory that gives the tag a special status. For example, a certain flag or bit can be selected that allows the RFID tag to communicate with an RFID reader that generates a particular type of interrogation signal.

When a user engages the RFID tag switch, for example, when the user depresses a push-button switch integral to a hand-held device, an RFID integrated circuit chip detects the switch contact closure event and relays this information along with an identifying ID code to a nearby RFID reader. The RFID reader transfers this information to a data processing unit (i.e. a data management software system) for additional processing. Based on the tag ID code, the software system presents the user with additional information via a user interface (i.e., a display on a hand-held unit). This additional information can include, for example the name of the item, its location, manufacturing date or previously measured performance data.

The typical RFID tag is attached to an item and contains information related to the item. When a user grasps the item, there is a high likelihood that the user's hand will at least partially block the RF communication path between the RFID reader antenna and the RFID tag antenna. The amount of RF power absorbed by the user's hand depends on the frequency of the RF signal and the strength of the RF signal and determines whether RF communication between the RFID tag and the RFID reader is interrupted.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

Several exemplary embodiments of the invention are described in greater detail, with reference to the accompanying drawings. Whenever possible, the same reference numerals are used throughout the drawings to refer to the same or like parts.

RFID Tag with ON-OFF Switch States

As discussed above, a prior-art passive RFID tag is unable to store power from a RF signal from an RFID-tag reader when RF communication (and hence power) between the RFID tag and the RFID-tag reader is interrupted. This can prevent switching events from being recorded by the RFID-tag reader. Several different example embodiments of RFID systems and methods that address problems associated with recording RFID-tag switching events are set forth below.

a) RFID Tag with Local Energy Storage Device

Figure 1:
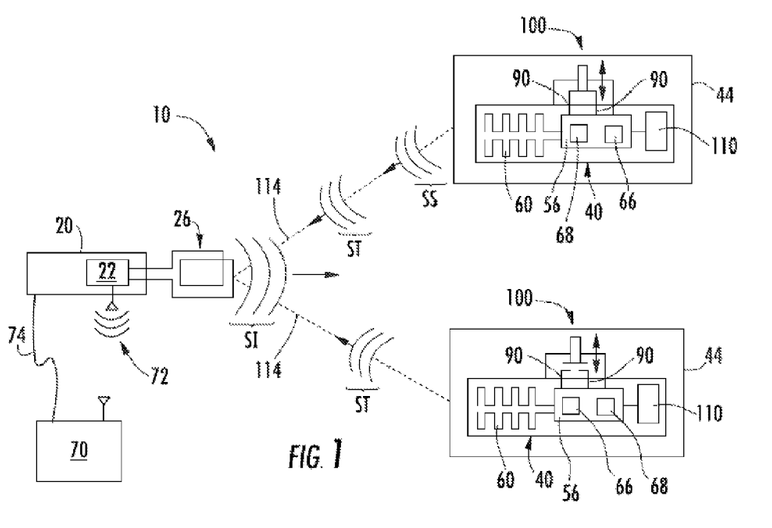
FIG. 1 is a schematic diagram of a first example embodiment of an RFID system that includes a switchable RFID tag that is able to remain powered when the RF communication path between the RFID reader and the RFID tag is interrupted.

FIG. 1 is a schematic diagram of a first example embodiment of an RFID system 10 according to the present invention. RFID system 10 includes an RFID-tag reader ("RFID reader") 20 that includes signal generation/processing electronics ("reader electronics") 22 operably connected to an antenna system ("reader antenna") 26. RFID reader 20 is adapted to generate a RF interrogation signal SI designed to interrogate an RFID tag 40 and to receive a RF tag signal ST from the RFID tag 40. Interrogation signal SI also serves to power the passive RFID tag 40 and so is also referred to herein as a "RF interrogation field."

In this embodiment, RFID system 10 is shown to include a plurality of passive switchable RFID tags 40, which is shown attached to an item 44. Two items 44 and their corresponding RFID tags 40 are shown for the sake of illustration. RFID tag 40 includes an RFID integrated circuit (IC) chip 56 operably coupled to a RF antenna system ("tag antenna") 60. RFID IC chip 56 includes a memory device 66 that stores information to be transmitted to RFID reader 20 via tag signal ST, and an energy storage unit 68 that stores energy for powering the chip. In this first example embodiment, memory device 66 stores information related to item 44, such as the item serial number, item type, manufacturer, manufacturing date, installation date, location, lot number, performance parameters, identification of other items that relate to or that are connected to the item, etc. Such information can be preloaded on RFID IC chip 56 upon manufacture or upon installation by writing the information to the RFID IC chip using an RFID reader. It is also anticipated that memory device 66 stores other information, such as information relating to the switch state of RFID tag 40, as described below.

RFID tag 40 further includes additional wires 90 that electrically connect RFID IC chip 56 with an activation device. As an example of such an activation device a switch 100, such as a push-button switch is shown. Switch 100 moves up and down, as shown by the double-ended arrow and that has two switch states. When switch 100 is engaged to establish a connection between wires 90 (as shown in the upper RFID tag in FIG. 1), the switch is in the ON state (position). Similarly, when switch 100 is engaged to interrupt the connection between wires 90 (such as shown in the lower RFID tag in FIG. 1), the switch is in the OFF state (position). In an example embodiment, switch 100 is designed so that a user needs to remain engaged with the switch so that it stays in the ON state. Otherwise, switch 100 remains in the OFF state. Information about switch-ON events (when the switch has been depressed) is communicated from RFID tag 40 to RFID reader 20 via a switch-state signal SS.

Furthermore, in an example embodiment memory device 66 is adapted to store information about the number of times switch 100 is placed in the ON state (i.e., "switch-ON events"). Information relating to switch-ON events can be stored using, for example, a switch-state memory bit that goes to "1" when switch 100 is placed in the ON state but when switch-state signal SS is not yet generated, and that goes to "0" when switch-state signal SS is transmitted ON state In an example embodiment, the switch-state memory bit goes from 0 to 1 regardless of the number of times the switch is placed in the ON state prior to switch-state signal SS being transmitted.

In said first example embodiment, RFID tag 40 also includes a local energy storage device 110 electrically coupled to RFID IC chip 56. Local energy storage device 110 is in addition to (or replaces) chip-based energy storage unit 68 and in an example embodiment allows RFID tag 40 to store energy from interrogation signal SI even when the RFID tag switch 100 is in the OFF state.

As discussed in greater detail below, in addition to interrogation signal SI, RFID reader 20 is also preferably adapted to generate other RF signals that do not necessarily elicit RF tag signal ST but instead either elicit other types of RF signals (e.g., switch-state signal SS or another type of status signal), or that sets a condition within the RFID tag (e.g., a signal SR, discussed below, that sets or re-sets the switch-state memory bit in memory device 66).

In said first example, RFID system 10 includes a database unit 70 operably coupled to RFID reader 20, e.g., via a wireless connection 72 or a non-wireless connection 74, such as an optical fiber or wire-based connection. In a further embodiment, database unit 70 may be incorporated directly into RFID reader 20. Database unit 70 is adapted to store information relating to one or more RFID tags and/or its associated items 44 in order to facilitate identification, mapping, or other processing of information received from one or more RFID tags 40. In a more specific example embodiment relating to managing optical fiber communication systems and the associated items that make up such systems, database unit 70 includes information that correlates a unique identification number of an RFID tag to a particular plug and/or socket, to a particular component (such as a fiber optic cable assembly with one or more connectors), to other portions of the component (such as correlating a first connector of a fiber optic cable to a second connector, or grouping multiple adapters of a patch panel, etc.), to past and/or current mating components, and any other parameter, connection, association, or other information that a technician may want to know or record when working with and/or monitoring the one or more components.

RFID reader 20 and RFID tag 40 communicate over a RF communication path 114 when the two are within the reading distance $D_R$ of each other (see FIG. 3, introduced and discussed below). Reading distance $D_R$ is determined based on a number of factors, including the relative strengths of the various signals from the RFID reader and the RFID tag, as well their relative antenna strengths and the frequency of the signals used.

Figure 2:
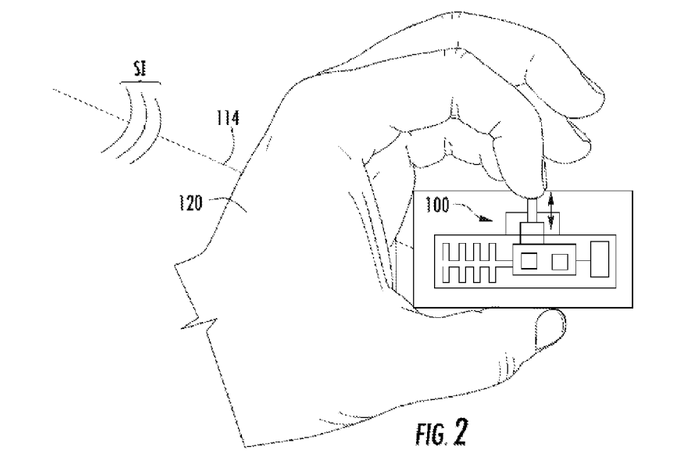
FIG. 2 is a schematic diagram of the RFID tag of FIG. 1, wherein a user's hand interrupts the RF communication path when the user engages the RFID-tag switch.

With reference to FIG. 2, in the operation of RFID system 10 of FIG. 1, a user seeks to activate the item 44 by engaging switch 100, by grasping item 44 by hand. As shown in FIG. 2, it is highly likely that in so engaging the switch 100, the user's hand is placed in such a way that their hand 120 is inserted into the RF communication path 114 and thus blocks interrogation signals SI from RFID reader 20 from reaching RFID tag 40. This prevents the RFID tag from receiving adequate power to operate, which means that when the user places switch 100 to the ON state, RFID tag 40 does not have sufficient power to transmit switch-state signal SS. Normally, if the user were to allow switch 100 to return to the OFF state, then switch-state signal SS would not be sent when RF communication between the RFID tag and RFID reader is re-established and adequate power is delivered to the RFID tag because the switch-ON event would not be recorded.

However, in the instant embodiment, when the user engages switch 100 to the ON state, the RFID tag 40 would continue to be powered by either the energy storage unit 68 or the local energy storage device 110, thereby allowing the memory device 66 to record this switch-change event, as described above. The switch-state memory bit in memory device 66 remains at 1 regardless of how many times the user turns the switch ON and OFF prior to RFID tag 40 transmitting switch-state signal SS.

Figure 3:
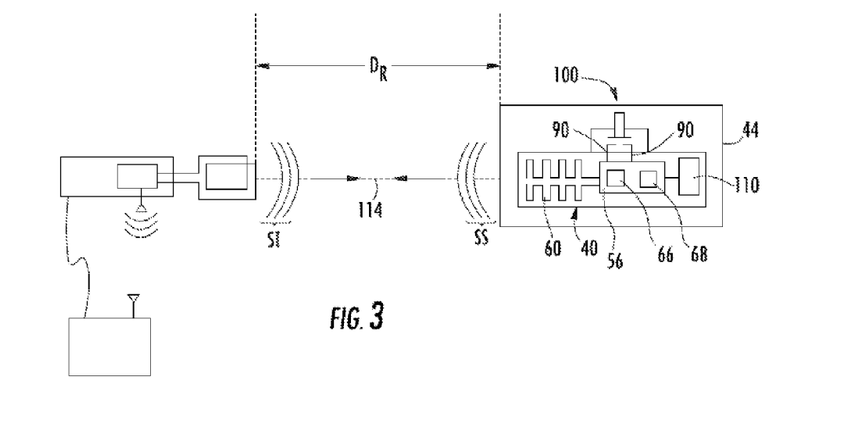
FIG. 3 is a schematic diagram similar to FIG. 1, illustrating a situation where the user's hand no longer interrupts the RF communication path but wherein the RFID tag still transmits a switch-state signal even when the RFID-tag switch is in the OFF state.

With reference now to FIG. 3, after the user removes their hand 120, RF communication path 114 is no longer interrupted and RFID tag 40 is able to receive adequate power from interrogation signal SI from RF reader 20. Since the switch-state memory bit was set to 1, the RFID tag responds in a delayed fashion by sending switch-state signal SS to RFID reader 20. Where there is more than one RFID tag 40, the transmission and reception of switch-state signals SS from the various RFID tags is preferably carried out in an orderly manner, i.e., by avoiding interference with other RFID tags that may have also had their switches placed in the ON state during the same period. This is accomplished by using standard RFID communication algorithms.

Figure 4:
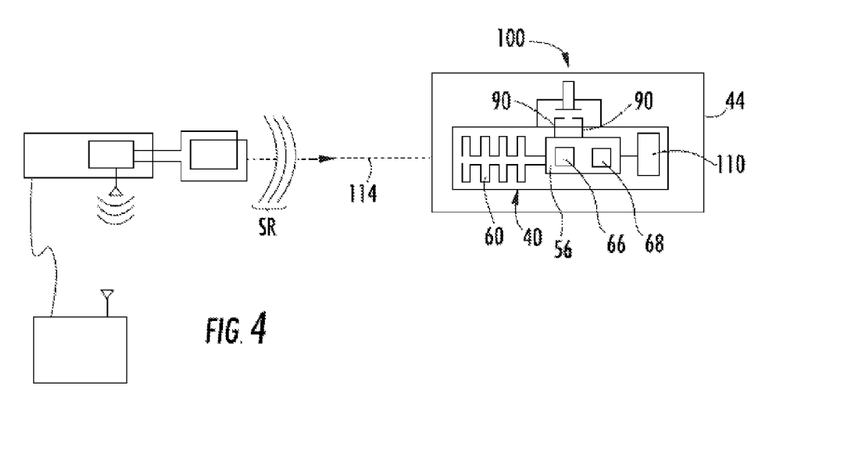
FIG. 4 is a schematic diagram similar to FIG. 1, wherein the RFID reader sends a reset signal to the RFID tag to reset the switch-state memory bit in the RFID tag's memory device.

After switch-state signal SS is received and processed by the RFID reader, the switch-state memory bit in memory device 66 is set to 0. This is accomplished, for example, as illustrated in FIG. 4 by RFID reader 20 sending a reset signal SR once switch-state signal SS is received and processed.

If the user were to hold their hand 120 in a position that blocks the RF communication path 114 between RFID reader 20 and RFID tag 40 for a sufficiently long time, chip-based energy storage unit 68 will be depleted of energy to the point that the RFID IC chip 56 cannot function properly. This would lead to the switch-ON memory bit being lost. However, if RFID tag 40 is also able to detect that it has completely lost power (using additional techniques such as described below), it would know that the state of the "switch-ON" memory bit was invalid and it would not switch-state memory bit transmit switch-state signal SS.

Accordingly, in said first example embodiment, local energy storage device 110 is used for powering RFID IC chip 56 until RF communication between RFID reader 20 and RFID tag 40 is re-established and adequate power is received by the RFID tag. Energy storage device 110 is charged by harvesting the power in RF interrogation signal(s) SI during a period of time prior to when RF communication between RFID reader 20 and RFID tag 40 was interrupted. Energy storage device 110 is designed to power RFID IC chip 56 for a period of time longer than the typical time required by a user to maintain switch 100 in the ON state (e.g., 5-10 seconds or greater). In an example embodiment, energy storage device 110 is or includes an electric capacitor or a long-life trickle-charge battery.

b) Local Memory for Latching the Switch-ON Event

In some RFID applications it may be desirable to avoid adding a local energy storage device 110 as described above due to size, cost and/or lifetime considerations. In this case, interruption in RF communication between RFID reader 20 and RFID tag 40 due, for example, to the presence of the user's hand, inhibits RF power harvesting and causes the RFID IC chip to lose power after a short period of time, usually much less than 1 second. Consequently, the RFID IC chip 56 will be unable to actively detect if or when switch 100 is placed in the ON state.

Figure 5:
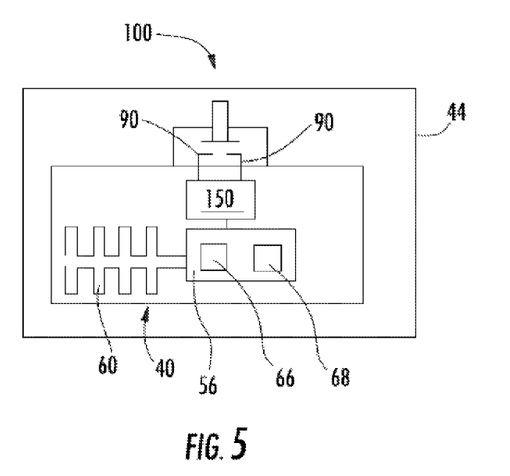
FIG. 5 is a schematic diagram of an example embodiment of an RFID tag similar to that shown in FIG. 1, wherein the RFID tag includes a local memory device for storing information regarding switch-ON events while the RFID tag is unpowered.

In a second embodiment, FIG. 5 is a schematic diagram of an RFID tag 40 that includes or, is otherwise operably coupled to, a local memory device 150. The local memory device 150 serves to record an activation event of item 44 and RFID tag 40. Although in this embodiment, the activation event is shown by the depressing of switch 100, item 44 may be activated in numerous ways, for example, by simply touching item 44. Local memory device 150 provides a local memory storage function based on either mechanical, electrical or thermal effects, as described below.

Figure 6:
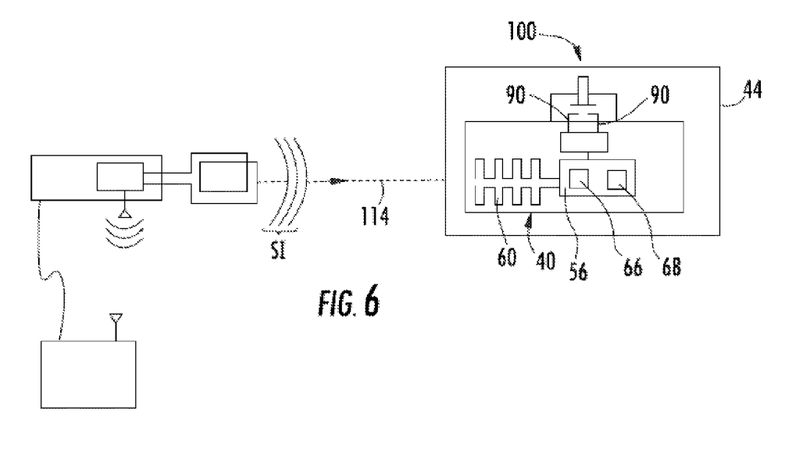
FIG. 6 is a schematic diagram similar to that of FIG. 1 but including the RFID tag of FIG. 5, illustrating normal operation of the RFID tag when the RF communication path is uninterrupted so that the RFID tag is powered by the interrogation signal from the RFID reader.
Figure 7:
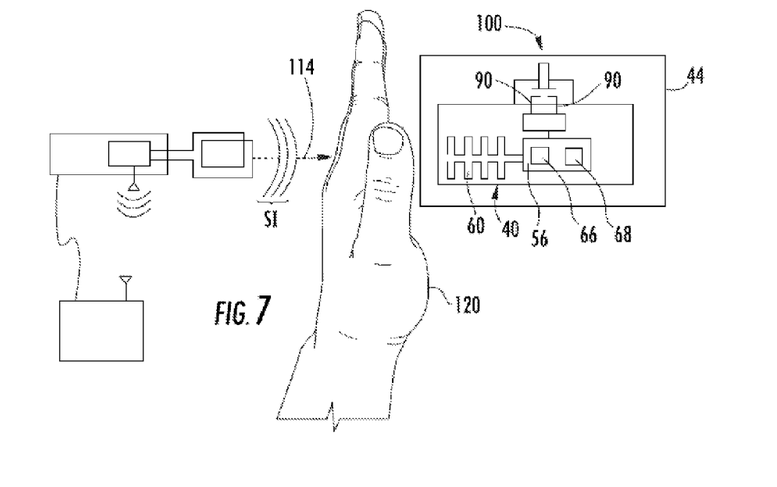
FIG. 7 is the schematic diagram of FIG. 6, but with a user's hand blocking the RF communication path so that the RFID tag does not receive power from the RFID reader's interrogation signals.

Regardless of the type of local memory device 150 used, the general operation of RFID system 10 that uses RFID tag 40 of FIG. 5 is as follows. With reference to FIG. 6, RFID IC chip 56 is first powered by RF interrogation signal SI from RFID reader 20. At this point, the switch 100 is OFF so that the local memory storage device 150 is set (or reset) to a state indicating that the switch has not yet been placed in the ON state. Next, with reference to FIG. 7, RF communication path 114 between RFID reader 20 and RF tag 40 is then blocked, thereby interrupting RF communication and causing the RFID IC chip 56 to lose power within a short period of time—say, within about 4 seconds. As described above, this typically happens when the user puts their hand 120 between RFID reader 20 and RFID tag 40. It should be noted that RFID tag 40 may receive some power via interrogation signal SI even when RF communication path 114 is blocked because the blockage may simply serve to attenuate the interrogation signal. However, RFID tag 40 needs to receive some threshold signal level adequate to power up RFID IC chip 56 so that it can properly operate. In this case, proper operation would entail sufficient energy to record an activation event to the local memory device 150, such that this event can be properly communicated to the RFID reader 20.

An activation event occurs when the user then places switch 100 in the ON state. Local memory storage device 150 is adapted so as to record and retain said activation information, namely information about switch 100 being in the ON state (i.e., "switch-ON" events). RF communication between RFID reader 20 and RFID tag 40 is then re-established—say by the user removing their hand 120 from item 44 or the RFID tag itself so that the RF communication path 114 is no longer blocked. This allows RFID tag 40 to receive interrogation signal SI and power up the RFID IC chip 56.

Figure 8:
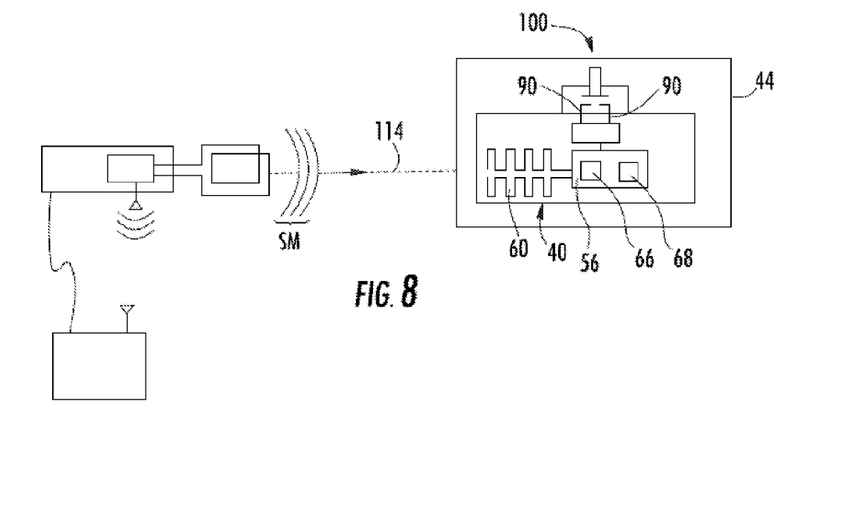
FIG. 8 is the schematic diagram of FIG. 6, but with the RFID reader sending a memory status signal to determine whether the switch was placed in the ON state while the RFID tag was unpowered.

After RFID IC chip 56 regains power, then with reference to FIG. 8, in an example embodiment the state of local memory storage device 150 is interrogated by RFID reader 20 using a memory status interrogation signal SM to determine if switch 100 was placed in the ON state while RFID tag 40 was unpowered. In another example embodiment, switch-state signal SS is triggered by interrogation signal SI, which is normally used to elicit transmission of tag signal ST. In another example embodiment, switch-state signal SS is sent automatically as soon as RFID IC chip 56 is powered up and a switch-state memory bit value of 1 is detected.

Once switch-state signal SS is sent, local memory storage device 150 is reset to enable the detection of subsequent switch activations. In an example embodiment, local memory storage device 150 is reset actively by RFID reader 20 sending a reset signal SR (as discussed above in connection with FIG. 4), or is reset passively by RFID IC chip or some other locally-induced reset initiation source.

Three different example embodiments for implementing local memory storage device 150 are described immediately below.

Mechanical Local Memory Storage Device

Figure 9:
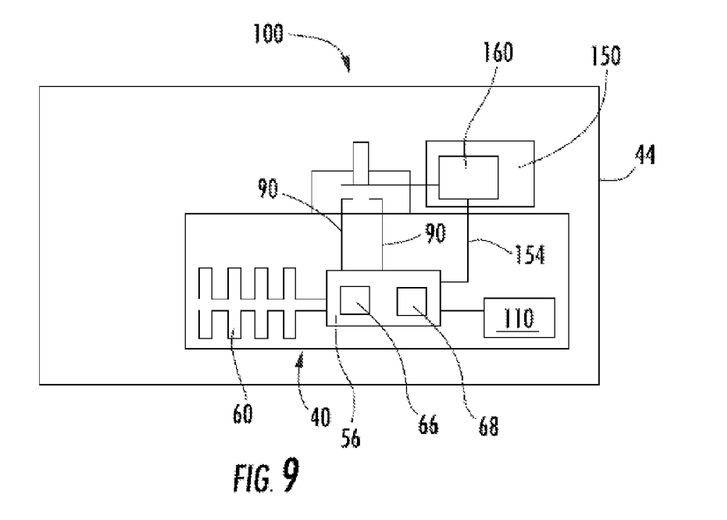
FIG. 9 is a schematic diagram similar to FIG. 5, illustrating an embodiment wherein the local memory device includes a mechanical latch mechanically coupled to the RFID-tag switch.

FIG. 9 is a schematic diagram similar to FIG. 5, illustrating another example embodiment of RFID system 10, wherein local memory storage device 150 is or includes a mechanical latch 160. Mechanical latch 160 is mechanically coupled to switch 100 and is also optionally electrically coupled to RFID IC chip 56 via an electrical connection 154. In one embodiment, as shown in FIG. 9, mechanical latch 160 is adapted to maintain switch 100 in the ON state, e.g., maintain an electrical connection between wires 90 after the user places the switch in the ON state. When RFID IC chip 56 regains power, it detects that switch 100 has been placed in the ON state directly via completion of the switch circuit and/or via separate electrical connection 154.

Using this mechanical approach, it is important to unlatch mechanical latch 160 after RFID IC chip 56 has responded to interrogation signal SI from RFID reader 20. This unlatching operation can be implemented in a number of ways. In a first example embodiment, mechanical latch 160 is designed to unlatch automatically after a certain period of time. This unlatching latency can be provided, for example, by the mechanical relaxation of a deformed or buckled member such as a beam or blister element. The relaxation time can be determined by material properties and geometry of the deformed element. In another example embodiment, mechanical latch 160 includes a mechanical two-position rocker or slide switch (not shown). In this mechanical two-position rocker embodiment, the user manually moves the switch back to its original state before any subsequent switch is detected.

In another example embodiment, mechanical latch 160 is unlatched via a command (e.g., re-set signal SR) from RFID reader 20 or RFID IC chip 56 that travels to the latch via electrical connection 154. This approach requires an electromechanical unlatching mechanism, such as a solenoid-activated latch or a thermally-activated shape memory alloy, or a bi-metallic actuator. While the power levels required to activate such electro-mechanical actuators might seem high, energy harvested from interrogation signals SI can be stored in an optional local energy storage device 110 (e.g., a capacitor) to enable a rapid pulse discharge through the electromechanical actuator to unlatch the mechanical latch.

In another example embodiment, mechanical latch 160 is unlatched via flexure of a bi-metallic strip (not shown). The strip is designed to buckle into an unstable deformed state based on mechanical pressure from the user activating switch 100. Heat from the user's hand causes the bi-metallic strip to remain in the buckled state for a short period of time. After the bi-metallic strip cools, switch 100 returns to its non-depressed state via deflection of the bi-metallic strip. The thicknesses, specific heat capacities and thermal conductivities of materials in proximity to the bi-metallic strip are tuned to achieve a desired delay between the time the user removes their hand from switch 100 and the time the switch returns to its OFF (e.g., non-depressed) state.

In another example embodiment, mechanical latch 160 serves as the memory storage device 150 and further eliminates the need for a separate switch 100. In such an embodiment, the activation event causes the mechanical latch 160 to move from a first state to a second activated state and to remain in said second activated state. Hence, once power is restored to the RFID IC chip 56 from the RFID reader 20, the RFID IC chip 56 reads the position of the mechanical latch 160 and communicates that an activation event has occurred.

Electrical Local Memory Device

Figure 10:
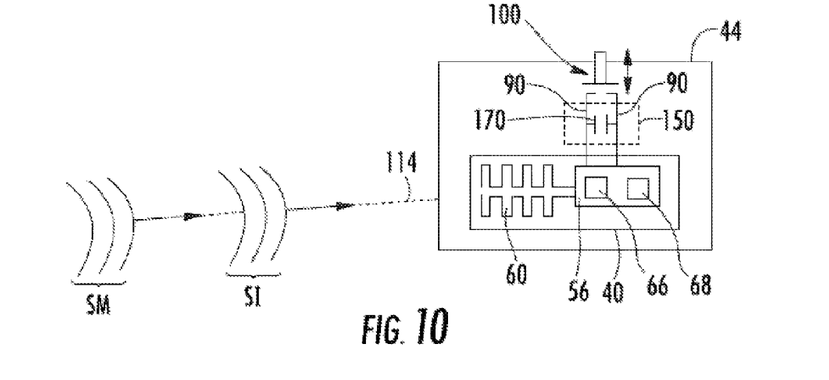
FIG. 10 is a schematic diagram similar to FIG. 9, illustrating an example embodiment of an electrical local memory device that includes a discharge capacitor.

FIG. 10 is a schematic diagram similar to FIG. 9, wherein local memory device 150 includes a discharge capacitor 170. In an example embodiment, discharge capacitor 170 is connected in parallel between wires 90 that connect RFID IC chip 56 to switch 100. RFID IC chip 56 is adapted to charge discharge capacitor 170 and to sense when the capacitor discharges. Capacitor 170 can be implemented as a discrete electrical component external to RFID IC chip 56 and to RFID tag 40, as shown, can be external to the RFID IC chip but internal to RFID tag 40, or can be integrated onto the RFID IC chip.

In an example embodiment of the operation of local memory device 150 of FIG. 10, RFID IC chip 56 is first powered up by a RF signal (e.g., interrogation signal SI) from RFID reader 20, which also leads to discharge capacitor 170 being fully charged up. RF communication between RFID reader 20 and RFIG tag 40 is then interrupted (e.g., by the user placing their hand around item 44). This causes RFID IC chip 56 to lose power within a short period of time (e.g., in 4 seconds or less). Discharge capacitor 170 remains charged during this period. The user then places switch 100 into the ON state, which closes the circuit and allows current to flow out of and discharge the discharge capacitor 170.

The user then removes their hand from the item 44, which re-establishes RF communication between RFID reader 20 and RFID tag 40. This allows RFID IC chip 56 to receive interrogation signal SI and use this signal to regain power. After RFID IC chip 56 regains power, the state of discharge capacitor 170 is interrogated by RFID reader 20 to determine if switch 100 was placed in the ON state while RFID IC chip 56 was unpowered. This interrogation can be implemented via a separate memory-status interrogation signal SM, similar to that described above. After the state of discharge capacitor 170 is read, it is recharged to enable detection of a subsequent switch-ON event.

As is now clear to the reader, discharge capacitor 170 may serve as the memory storage device 150 and eliminate the need for a separate switch 100. In such an embodiment, the activation event causes the discharge capacitor 170 to move from a first charged state to a second fully-discharged state. Once power is restored to the RFID IC chip 56 from the RFID reader 20, the RFID IC chip 56 reads the condition of the discharge capacitor 170 and if the discharge capacitor 170 is in the fully discharged state, communicates that an activation event has occurred.

Since discharge capacitor 170 eventually discharges on its own even if the switch 100 is not placed in the ON state, RFID IC chip 56 needs to periodically check the charge on discharge capacitor 170. If discharge capacitor 170 is only partially discharged (e.g., the amount of charge falls below a charge threshold level), RFID IC chip 56 recharges the capacitor without registering a switch-ON event. If discharge capacitor 170 is completely discharged, RFID IC chip 56 registers a switch-ON event and then waits for subsequent RFID reader interrogation (via status signal SS) regarding the switch-ON event. This situation corresponds, for example, to the case where the user's hand 120 did not sufficiently block interrogation signal SI while the user was engaging switch 100.

The discharge of discharge capacitor 170 presents a challenge in cases where RFID IC chip 56 is unpowered for a long period of time, i.e., greater than the time required for discharge capacitor 170 to discharge on its own if switch 100 is not placed in the ON state. In this case, RFID IC chip 56 is unable to implement the discharge capacitor checking process described immediately above. Discharge capacitor 170 will eventually discharge. When RFID IC chip 56 later regains power, it will find that the discharge capacitor has discharged and would possibly incorrectly infer that the discharge was the result of switch 100 being placed in the ON state when the RFID IC chip was unpowered.

Figure 11:
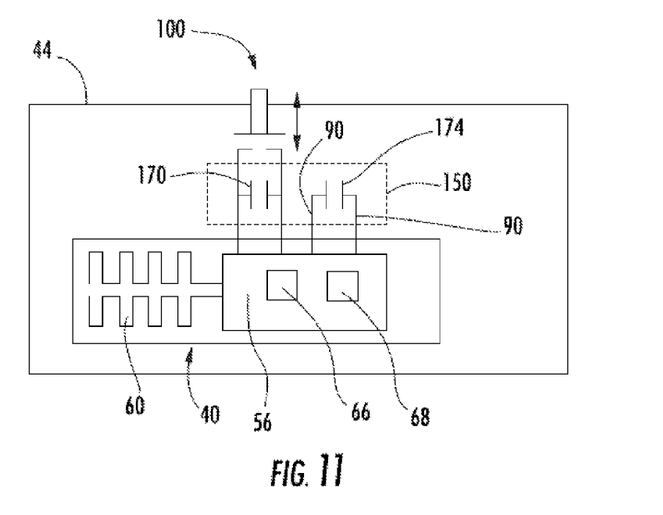
FIG. 11 is a schematic diagram similar to FIG. 10, illustrating an example embodiment wherein the electrical local memory device further includes a reference capacitor.

With reference to FIG. 11, in an example embodiment directed toward preventing erroneously inferring a switch-ON event, local memory device 150 includes a second reference capacitor 174 physically identical to discharge capacitor 170 and electrically coupled to RFID IC chip 56. Reference capacitor 174 can be provided in a number of locations, such as on RFID IC chip 56 or as an external discrete component such as shown in FIG. 11. Reference capacitor 174 is charged each time discharge capacitor 170 is charged. As both capacitors are identical (or substantially so) they discharge at approximately the same rate if switch 100 is not in the ON state. Reference capacitor 174 is used to detect the condition where the RFID IC chip 56 has been unpowered for a sufficient period of time for discharge capacitor 170 to discharge completely.

When RFID IC chip 56 is re-powered after a power disruption, the state of reference capacitor 174 is examined. If reference capacitor 174 is discharged, RFID IC chip 56 knows it has been unpowered for a long period of time and therefore ignores the state of discharge capacitor 170 as an indicator of a switch-ON event. On the other hand, if reference capacitor 174 is sufficiently charged, then RFID IC chip 56 knows that the charge state of discharge capacitor 170 is valid, and responds following the switch-ON protocol described above.

The above-described methods of detecting and preventing erroneous switch-ON events are important because loss of power events can occur simultaneously for many RFID IC chips 56 in different RFID tags 40 when interrogation signals SI from RFID reader 20 are even temporarily interrupted. Detecting erroneous switch-ON events prevent RFID reader 20 from being flooded with switch-state signals SS that represent invalid switch-ON events following simultaneous power loss for a large number of such RFID tags 40 that reside within the read distance of the RFID reader.

Temperature-Based Local Memory Device

Figure 12:
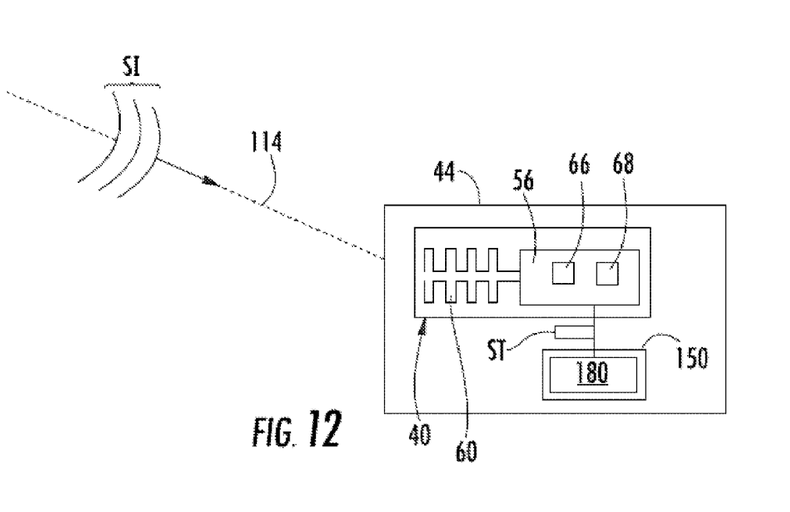
FIG. 12 is a schematic diagram similar to FIG. 5, illustrating an example embodiment wherein a temperature sensor serves as a switch.

FIG. 12 is a schematic diagram similar to FIG. 11, illustrating an example embodiment wherein local memory device 150 includes a temperature sensor 180 adapted to detect a temperature change due to the proximity of a user's hand 120 to RFID tag 40 or to item 44 to which the RFID tag is attached. In an example embodiment, temperature sensor 180 is implemented on or near the surface of item 44 and electrically interfaced to RFID IC chip 56. In another example embodiment, temperature sensor 180 is integrated with RFID IC chip 56. In another example embodiment, temperature sensor 180 resides within RFID tag 40 but remains external to RFID IC chip 56. When the user holds item 44 in their bare hand 120, the item rapidly heats up by several degrees C., particularly when item 44 is relatively small and has a substantial heat capacity. This temperature change is then detected by temperature sensor 180, which provides a temperature signal ST to the RFID IC chip.

With continuing reference to FIG. 12, in the operation of RFID system 10 shown therein, RFID IC chip 56 is initially powered by interrogation signal SI from RFID reader 20. In an example embodiment, RFID IC chip 56 has a dedicated memory location in memory device 66 that is used to flag a "switch-ON event." The corresponding switch-event memory bit is initially set to 0.

Figure 13:
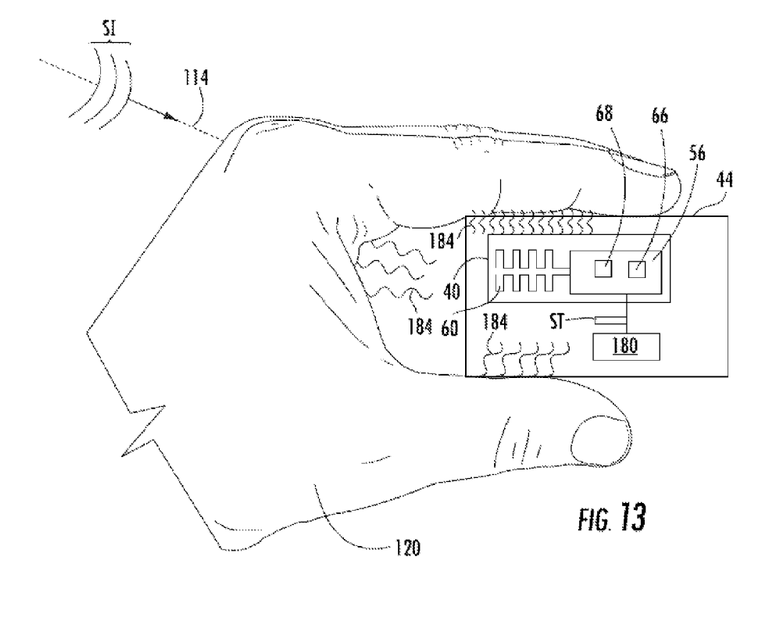
FIG. 13 is a schematic diagram similar to FIG. 12, illustrating how a user's hand serves to block the RF communication path and to also heat the item and thus the RFID tag attached thereto, so that the increased temperature of the item is recorded by the temperature sensor.

As illustrated in FIG. 13, the user then places their hand around item 44, which interrupts RF communication between RFID reader 20 and RFID tag 40, causing RFID IC chip 56 to lose power within a short period of time, e.g., 4 seconds or less. Item 44 also begins to increase in temperature due to the transfer of heat 184 from the user's hand 120 to the item. RFID IC chip 56 interprets a rate of change of temperature that exceeds a predefined threshold value as a switch-ON event and sets the switch-ON event memory bit to 1. This switch-ON event may or may not be detected by RFID reader 20, depending on the amount of time RFID IC chip 56 remains powered.

Figure 14:
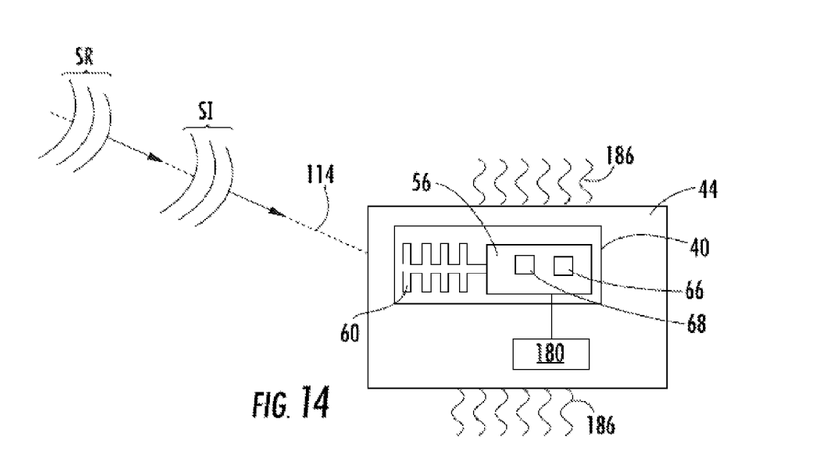
FIG. 14 is a schematic diagram similar to FIG. 13, but with the user's hand removed, illustrating how the RF communication path is restored and how the item and RFID tag cools down once the user's hand is removed.

With reference to FIG. 14, the user then removes their hand 120 from the item 44, which re-establishes RF communication between RFID reader 20 and RFID tag 40. This allows RFID IC chip 56 to regain power from interrogation signals SI, while also allowing item 44 to cool down by radiation heat 186. After the RFID IC chip 56 regains power, the temperature of item 44 is measured periodically over time by temperature sensor 180. If the rate of change of the temperature of the item decreases by more than a predefined threshold value, RFID IC chip 56 detects a switch-ON event and sets the switch-ON event bit to 1.

In an example embodiment, RFID reader 20 then interrogates all RFID tags 40 in the vicinity to elicit switch-state signals SS to identify those RFID IC chips 56 that detected a switch-ON event and that set the corresponding switch-state memory bit in the associated memory device 66 to 1. In another example embodiment, the RFID tags simply transmit their switch-state signal SS once the RFID tag is powered up and a switch-state memory bit value of 1 is detected.

In an example embodiment, RFID reader 20 receives the switch-state signals SS from one or more of the RFID tags 40 in its read range and responds by transmitting a reset signal SR that resets the switch-state memory bit to 0 (FIG. 14). The rate of temperature change of item 44 can be modified or controlled by adjusting the thicknesses, specific heat capacities and thermal conductivities of materials that make up the item.

Also, in an example embodiment, temperature sensor 180 may serve as the memory storage device 150 and eliminate the need for a separate switch 100. In such an embodiment, the activation event causes the temperature sensor 180 to rapidly increase in temperature, moving from a first temperature state to a second temperature state. Once the source of heat 184 is removed when the user removes his or her hand 120 from the item 44, this also re-establishes RF communication between RFID reader 20 and RFID tag 40. This allows RFID IC chip 56 to regain power from interrogation signals SI, while also allowing item 44 to cool down by radiation heat 186. After the RFID IC chip 56 regains power, the temperature of item 44 is measured periodically over time by temperature sensor 180. If the rate of change of the temperature of the item decreases by more than a predefined threshold value, RFID IC chip 56 detects an activation event has occurred and communicates this information to RFID tag 40.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio-frequency identification (RFID) tag for use with an RFID reader that transmits RF signals to the RFID tag via a RF communication path, comprising:
   an RFID integrated circuit (IC) chip electrically coupled to a RF antenna system and adapted to be externally powered by the RF signals;
   an energy storage device operably coupled to the RFID IC chip and adapted to store energy from the RF signals;
   a switch operably coupled to the RFID IC chip and configured to be placed in either an ON state or an OFF state, wherein the RFID IC chip is configured to operate when the switch is in the ON state and when the switch is in the OFF state; and
   a memory device operably coupled to the switch and the energy storage device and powered by the energy device so as to store switch-state information when the RFID IC chip is inadequately externally powered so that when the RFID IC chip is adequately externally powered it allows the tag antenna system to communicate a RF switch-state signal representative of the stored switch-state information.

2. The RFID tag of claim 1, wherein the energy storage device is external to the RFID IC chip.

3. The RFID tag of claim 1, wherein the memory device is integral with the RFID IC chip, and is operably coupled to the switch via the RFID IC chip.

4. The RFID tag of claim 1, wherein the memory device is external to the RFID IC chip, and wherein the RFID IC chip includes an internal memory device for storing tag information.

5. The RFID tag of claim 4, wherein the memory device external to the RFID IC chip includes at least one capacitor electrically coupled to the switch and to the RFID IC circuit.

6. A passive radio-frequency identification (RFID) tag for use with an RFID reader that transmits RF signals to the RFID tag via a RF communication path, comprising:

an RFID IC chip electrically coupled to a RF antenna system and adapted to be externally powered by the RF signals; and a latching memory device capable of moving from a first state to a second state upon an activation event to the RFID tag, even when this activation event occurs when power is interrupted between the RFID reader and the RFID IC chip, such that when the RFID IC chip is adequately externally powered it allows the tag antenna system to communicate a RF signal representative of the stored second state information, and the RFID IC chip is operative if the latching memory device is in both the first state or the second state.

7. The RFID tag of claim 6, wherein the latching memory device includes a temperature sensor electrically coupled to the RFID IC circuit, wherein the first state is defined by a first temperature-related threshold and the second state is defined by a second temperature-related threshold.

8. The RFID tag of claim 7, wherein at least one of the first and second temperature-related thresholds is a temperature rate-of-change threshold.

9. The RFID tag of claim 6, wherein the latching memory device is an electromechanical switch.

10. The RFID tag of claim 6, wherein the latching memory device is a dischargeable capacitor.

11. The RFID tag of claim 10, further comprising a reference capacitor, wherein the dischargeable capacitor is compared to the reference capacitor to determine whether the discharge is a result of the activation event or a result of leakage that would discharge the reference capacitor in the same manner as it would the dischargeable capacitor.

12. The RFID system as described in claim 11, wherein the memory device comprises a temperature sensor being electrically coupled to the RFID integrated circuit chip, such that as the RFID tag is activated by the hand of a user, the temperature sensor increases in temperature, and as the hand is removed the temperature sensor shows a decrease in temperature, thus when the RFID integrated circuit chip is interrogated after energy has been restored, the RFID integrated circuit chip calculates the rate at which the temperature sensor is dropping in temperature and thereby concludes that an activation event has occurred.

13. A passive radio-frequency identification (RFID) system comprising:

an RFID reader having an RFID reader antenna capable of transmitting an RF signal; and an RFID tag comprising:

an RFID integrated circuit (IC) chip containing a memory device for storing information to be communicated to the RFID reader;

an RFID tag antenna coupled to the RFID integrated circuit IC chip, capable of communicating an RFID response signal to the RFID reader;

an energy storage device that stores energy for powering the memory device, the energy storage device being electrically coupled to the RFID IC chip, wherein the energy storage device is selected so as to store energy from the RF signal to power the memory device in the event that power to the RFID IC chip is interrupted; and a condition sensing device having a first state and a second state and powered by the energy storage device, the condition sensing device being electrically connected to the RFID tag, and wherein the condition sensing device may be switched from the first state to the second state when the power to the RFID IC chip is interrupted;

wherein the RFID tag antenna is configured to communicate the RF signal representative of the stored second state information when the power to the RFID IC chip is resumed.

14. The RFID system of claim 13, wherein an operator engages the switch to change the switch from the first state to the second state.

15. The RFID system of claim 13, wherein the energy storage device is capable of powering the RFID IC chip.

16. The RFID system of claim 13, wherein the energy storage device is an electric capacitor.

17. A passive RFID system comprising:

an RFID reader having an RFID reader antenna capable of transmitting an RF signal, and an RFID tag comprising:

an RFID integrated circuit chip, an RFID tag antenna coupled to the RFID integrated circuit chip, capable of receiving energy from the RF signal, a memory device for storing information to be transmitted to the RFID reader, the memory device having a first state and a second activated state, and being operably connected to the RFID integrated circuit chip, and where the RFID tag antenna coupled to the RFID integrated circuit chip is capable of communicating an RFID response signal to the RFID reader, wherein the memory device is capable of recording a change from its first state to its second activated state during periods when the energy from the RF signal is insufficient to cause the RFID integrated circuit chip to record the change in memory device states.

18. The RFID system of claim 17, wherein the memory device comprises a mechanical latch having a first resting state and a second latched state, such that when power to the RFID integrated circuit is interrupted, the mechanical latch can still be placed into the second latched state by an external event, and when energy has been restored to the RFID integrated circuit, the RFID integrated circuit can record the fact that the mechanical latch has been engaged and communicate that information as an RFID response signal back to the RFID reader.

19. The RFID system as described in claim 18, wherein the mechanical latch is disengaged once the RFID integrated circuit has communicated that information as an RFID response signal back to the RFID reader.

20. The RFID system as described in claim 19, wherein the mechanical latch disengages automatically after a certain amount of time.

21. The RFID system as described in claim 17, wherein the memory device comprises an electrical capacitor having a first charged state and a second discharged state, the electrical capacitor being electrically coupled to the RFID integrated circuit chip, such that as the memory device switched from the first state to its second activated state, the electrical capacitor is discharged to place the electrical capacitor in the second discharged state, thus when the RFID integrated circuit chip is interrogated after energy has been restored to the RFID tag, this second discharged state is communicated as an RFID response signal back to the RFID reader.

22. The RFID system as described in claim 17, wherein the memory device comprises a first electrical capacitor having a first charged state and a second discharged state, the electrical capacitor being electrically coupled to the RFID integrated circuit chip, and a second electrical capacitor also having a first charged state and a second discharged state, the electrical capacitor being electrically coupled to the RFID integrated circuit chip, such that as the memory device is switched from the first state to its second activated state, the first electrical capacitor is discharged to place the electrical capacitor in the second discharged state, thus when the RFID integrated circuit chip is interrogated after energy has been restored to the RFID tag, the RFID integrated circuit chip compares the first electrical capacitor to the second electrical capacitor and if the first electrical capacitor is in the second discharged state while the second electrical capacitor remains in the first charged state, then an activation event is communicated as an RFID response signal back to the RFID reader.

23. In an RFID system providing a method for communicating an activation event that has occurred during a period of time in which power has been interrupted between an RFID reader and an RFID tag, comprising the steps of:

a. powering a first electric capacitor that is electrically attached to an RFID integrated circuit chip associated with the RFID tag, such that the first electric capacitor is placed in a charged state, b. simultaneously powering a second electrical capacitor that is also attached to the RFID integrated circuit chip of the RFID tag, such that the second electric capacitor is likewise placed in a charged state, c. switching a memory device from a first state to a second activated state, but in so doing, interrupting an RF signal to the RFID tag, and thereby interrupting power to the RFID tag, d. discharging the first electric capacitor upon switching the memory device to the second activated state, thereby moving the first electric capacitor from a charged stated to a second discharged stated, e. upon restoring power to the RFID integrated circuit chip, comparing the first electric capacitor to the second electric capacitor, and if the first electric capacitor is in the second discharged state while the second electric capacitor has remained in the charged state, f. communicating to the RFID reader that an activation event of the RFID tag has occurred.

* * * * *

UNITED STATES PATENT AND TRADEMARK OFFICE
CERTIFICATE OF CORRECTION

| | |
|---|---|
| PATENT NO. | : 9,159,012 B2 |
| APPLICATION NO. | : 12/956271 |
| DATED | : October 13, 2015 |
| INVENTOR(S) | : John David Downie et al. |

Page 1 of 1

It is certified that error appears in the above-identified patent and that said Letters Patent is hereby corrected as shown below:

In the claims

Claim 13, at column 13, lines 52-53, change "RFID integrated circuit IC chip" to --RFID IC chip--.

Signed and Sealed this
Fifth Day of April, 2016

Michelle K. Lee
*Director of the United States Patent and Trademark Office*